April 29, 1924.
C. C. CHRISTAL
1,491,845
INSECT TRAP
Filed Sept. 30, 1922
3 Sheets-Sheet 1
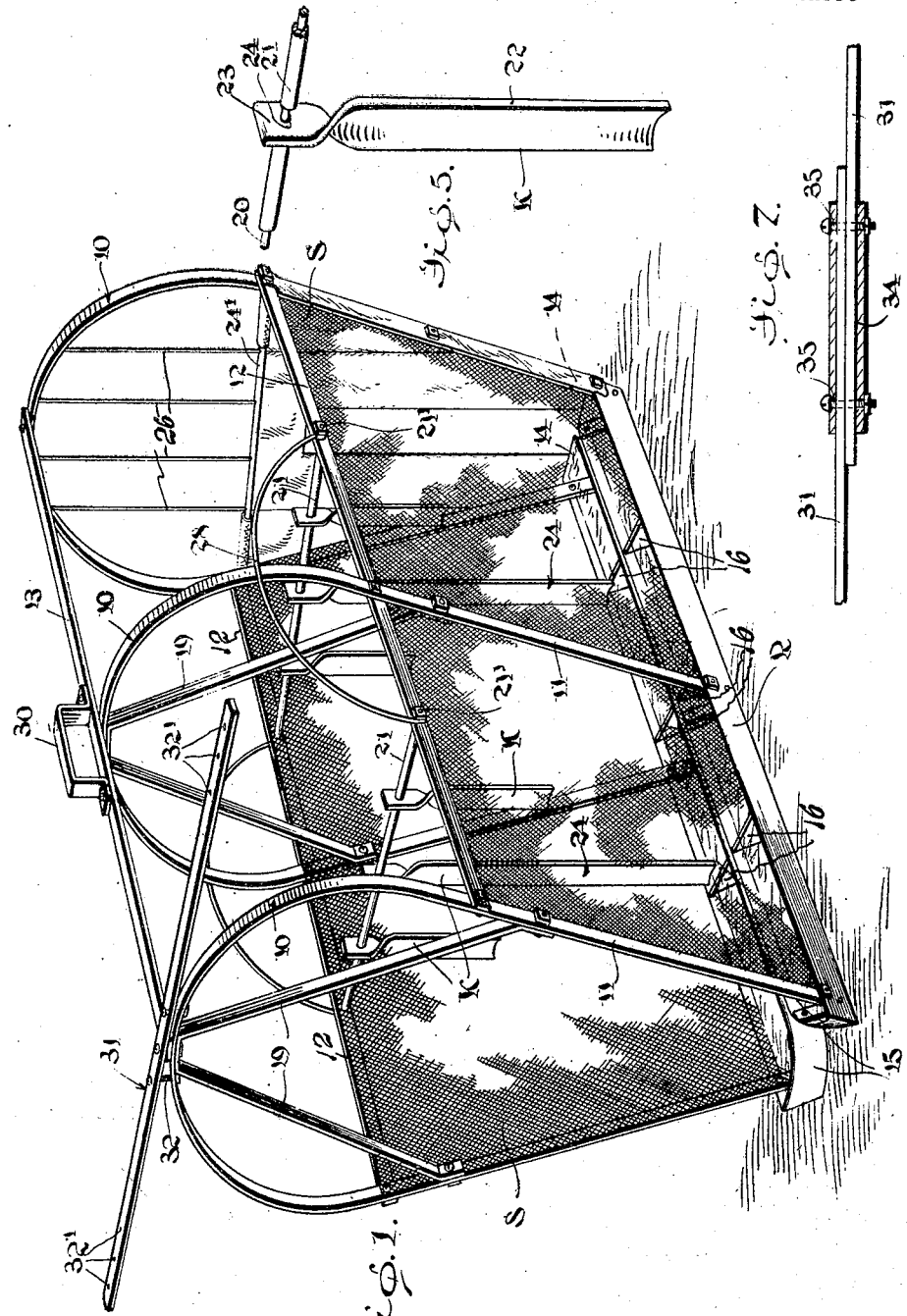
WITNESSES
R.E. Rousseau
INVENTOR
C.C. Christal,
BY
ATTORNEYS

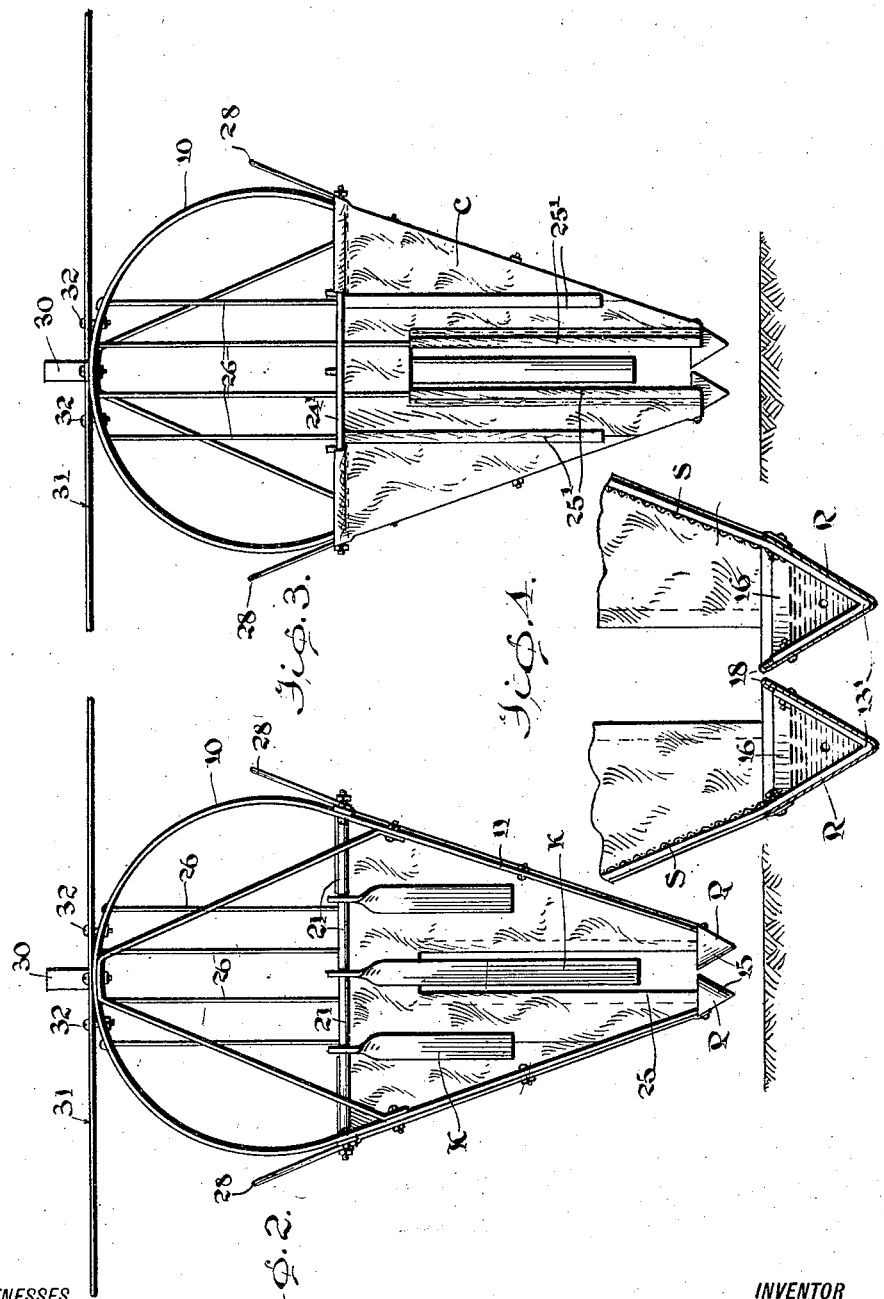

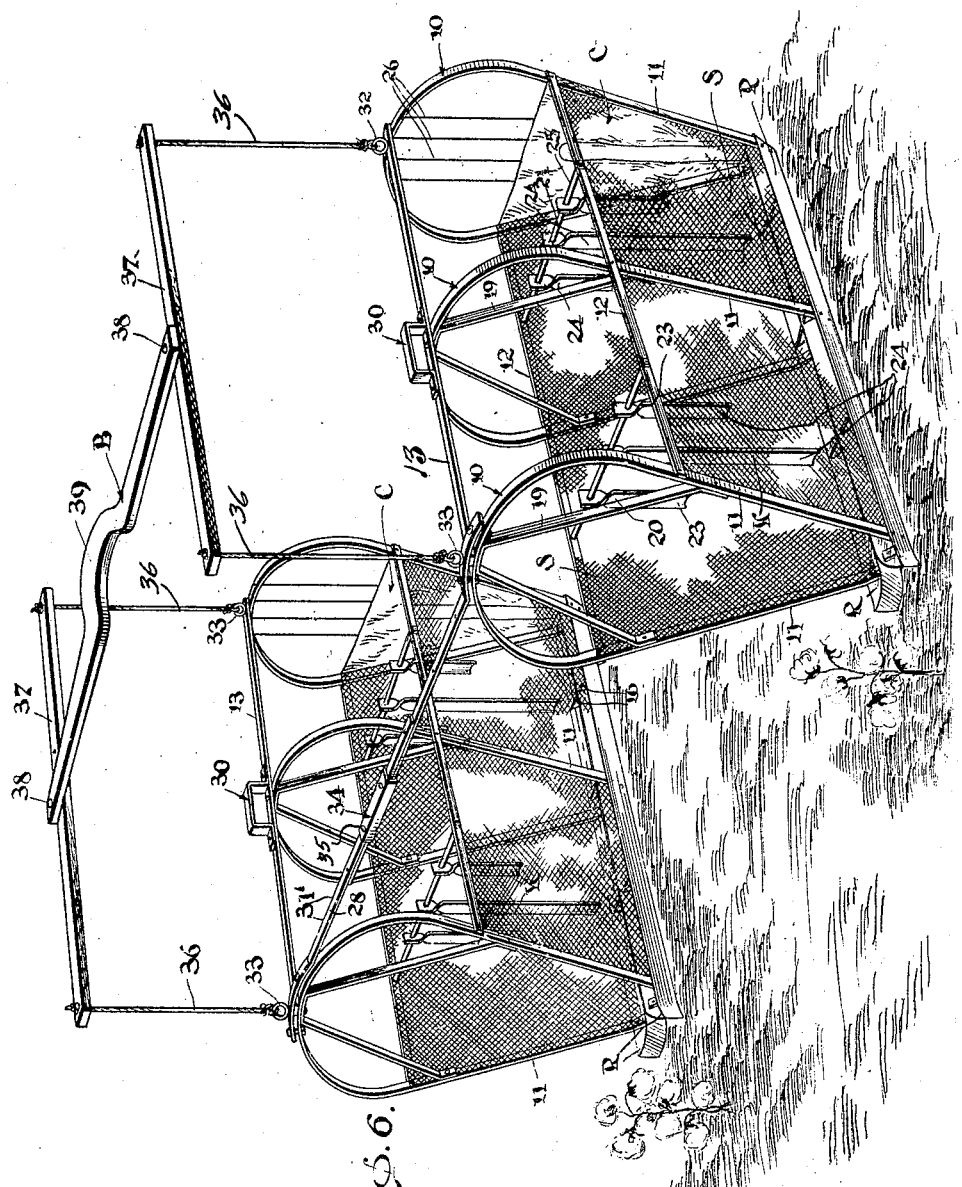

Patented Apr. 29, 1924.

1,491,845

UNITED STATES PATENT OFFICE.

CORNELIUS CARSON CHRISTAL, OF GABLE, SOUTH CAROLINA.

INSECT TRAP.

Application filed September 30, 1922. Serial No. 591,581.

*To all whom it may concern:*

Be it known that I, CORNELIUS C. CHRISTAL, a citizen of the United States, and a resident of Gable, in the county of Clarendon and State of South Carolina, have invented certain new and useful Improvements in Insect Traps, of which the following is a specification.

This invention relates to improvements in insect traps.

It is well known that certain insects, such as boll weevil, which is extremely injurious to cotton plants, may be caused to dislodge and fall from the cotton plants when the same are slightly jarred. This characteristic of the insect has led to many different constructions of traps with the objects of first, to jar or shake the cotton plants thereby to dislodge the boll weevil and cause the same to fall from the plants, and second, to provide a suitable receptacle means in which the insects may drop and be destroyed by a liquid or powdered poison within the receptacle.

The present invention is an improved trap of the above character and has among its objects to provide a trap which is highly efficient in operation; which is portable, and may be carried and operated by one person, or by two or more persons of minor years; and which may be utilized for operating upon one or more rows of cotton plants.

It is also an important object of the invention that the trap be adapted for operating upon cotton plants without injury thereto.

Other objects, and objects relating to details of construction, combination and arrangement of parts will hereinafter appear in the detailed description to follow.

The invention is illustrated by way of example in the accompanying drawings, in which:—

Figure 1 is a perspective view of a trap constructed in accordance with the present invention and defined to operate upon one row of cotton plants.

Figure 2 is a forward end elevation of the same.

Figure 3 is a rear elevation thereof.

Figure 4 is a detail transverse sectional view of the runners or troughs associated with the trap.

Figure 5 is a detail perspective view showing the form of knockers employed and the manner in which the same are supported.

Figure 6 is a perspective view showing two traps connected together and adapted to be employed for operating upon two rows of cotton plants.

Figure 7 is a detail view illustrating the manner in which the two traps are adjustably connected.

Referring to the drawings in detail and particularly to Figures 1 to 5 inclusive, the trap preferably comprises three frame members 10, each member being bow-shaped and its leg portions 11 converging. The similar legs of the members 10 are secured together, in each instance, by a frame member 12, and the bridge portions of said members are secured to each other by the frame member 13. The lower end of each leg 11 terminates in an inverted V-shaped portion 13', Figure 4, and the corresponding leg portions are in each instance disposed within a V-shaped trough or runner R; and each runner R has its rear end closed as at 14 by a vertical wall. Each runner R is also closed at its forward end as at 15, and these end closures preferably diverge with respect to each other, Figure 1. The V-shaped portions 13' of each frame member 10 may be riveted or bolted as shown to the associated runner R. Each runner R is provided with a plurality of transverse division walls 16 arranged longitudinally thereof, and each division wall is provided with an opening 17 adjacent its lower end, Figure 4, the purpose of which will later be described.

Each runner R has its longitudinal edges 18 turned inwardly, as shown in Figure 4, and by this arrangement the inner longitudinal edges of each trough or runner forms a substantially flush surface with the terminal ends of the frame members 10. The inturned edges of the runners occurring upon the outer longitudinal edges serve to brace the runners or troughs with respect to the frame members 10 in an obvious manner.

For the two foremost frame members 10 there is provided a substantially V-shaped brace 19. Between the frame members 12 there is secured a pair of rods 20, one occurring adjacent each end of the trap. Each rod carries a plurality of spacing sleeves 21, Figure 6. Each rod 20 has its ends extended through suitable openings provided in the frame members 12 and carrying a nut 21', thereby to secure the same in position. The nuts 21' occur, in each instance, upon the outer side of the frame members 12 and the sleeves 21 serve to limit the inner movement of said frame members.

Each rod 20 supports for swinging movement a plurality of knockers K; and each knocker K, as best shown in Figure 5, consists in a strip of metal substantially arcuate in cross section and with its longitudinal edges 22 rounded or bevelled and having its upper end terminating in a portion 23 which is twisted so that the faces thereof are disposed at right angles to the faces of the remainder of the strip. The portion 23 is provided with an opening 24 adapted to receive a rod 20 and thus to provide a pivotal connection between the rod 20 and knocker and permit swinging movement of the knocker. The knockers K for each rod are preferably three in number, and the intermediate knocker 24 is of greater length than the remaining two knockers. The opening K of each knocker is of less diameter than the sleeve 21 carried by the rods 20, and the sleeves are arranged so that a knocker will be disposed between the opposing ends of each pair of adjacent sleeves and thereby to retain the knockers in the one position upon the rods 20 as illustrated in Figure 5 of the drawings. The intermediate knockers 24 should be positioned at the longitudinal center of the rods 20.

A fine mesh screen S forms a closure between the frame member 12 and associated runner R in each instance. The screens S are preferably placed upon the inner side of the leg portions 11 of the frame members 10, and the lower longitudinal edges of said screens terminating within the runners R as illustrated in Figure 4 of the drawings in order to insure that any insects dropping against the inner side of said screens will be delivered into the troughs or runners R. Between the leg portions 11 of the rear frame member 10 there is secured a canvas C. The canvas C tapers longitudinally and toward its lower end as illustrated and is provided with a vertical opening 25 which is arranged centrally thereof and extends from the lower end of the canvas to a point adjacent the upper end of said canvas. The canvas is secured along its upper edge at each end thereof to a cross rod or bar 24', said cross rod being secured between the leg portions of the rear frame member 10.

The rear frame member 10 carries a plurality of rods 26, said rods being extended through suitable openings in the bridge portion of this member and being arranged in equal spaced relation. Each rod is provided with a head 27 to sustain the same. The two intermediate rods are of greater length than the outside rods and the lower ends thereof extend in close relation to the troughs or runners R. The rods 26 in each instance extend into a suitable hem as at 25' in the canvas C, said hems corresponding to the length of the rod. The two intermediate rods extend along the longitudinal edges of the opening 25 in the canvas C. The rods 26 should be highly flexible and easily bent. Also these rods should extend through suitable openings in the cross bar or rod 24' for the purpose of removably holding said rods in the position shown.

For each side of the trap there is provided a bail 28, said bails in each instance having each of its ends formed with a suitable eye adapted to receive either of the knocker supporting rods 20. The eyes on the bar in each instance are interposed between the nut 21' and the outer side of the associated frame member 12.

The frame member 13 has secured thereto a channel clip 30 to provide a hand grip for carrying the trap. The forward frame member 10 of the device has secured to the bridge portion thereof a bar 31, said bar having a portion intermediate its ends provided with suitable openings adapted to receive the bolts 32 whereby to secure the same to the forward frame member 10. Also adjacent each end of the bar 31 there is provided a plurality of bolt receiving openings 32 for a purpose which will later become apparent.

In the use of the present device, the troughs R may be partially filled with a liquid poison or a poison in the form of a powder. If a man intends operating the device he may grasp the grip 30 with one hand and with the other hand upon the associated end of the bar 31 guide the device so that the same may straddle a row of cotton plants. The forward knockers K will first engage the cotton plants to jar the same and after these knockers have operated upon the plants, then the rear knockers K will in turn operate for the same purpose. The intermediate knockers 24 will engage cotton plants of any height, while the outside knockers K will only disturb plants that have grown to a considerable height. The rearmost knocker 24 will swing rearwardly and move within the slot or opening 25 in the canvas C, and upon the plants moving through the slot or opening 23, the same will engage with the edges of the canvas forming the slot and spring the intermediate rods 26 rearwardly and outwardly to enable the cotton plants to pass. With this occurring there will be a brushing action to further insure that all of the insects have been dislodged from the cotton plants. In case that the cotton plants are too large to move through the slot 25 without injury, then the intermediate rods 26 may be removed and the remaining outside rods 26 permitted to serve substantially the same function.

The boll weevil upon being dislodged from the plants will of course fall upon the screens S and from thence slide into the troughs R and into the poison contained therein and thus be destroyed.

If persons of minor years operate the trap then the one person should position himself on each side of the trap and with one hand grasp the bar 28 and with the other hand the associated end of the bar 31. The bar 31 will of course be utilized for guiding the forward end of the device, while operating upon a row of cotton plants. It has been found that boys may in this way easily and without great exertion operate the trap in a successful manner.

In order that two rows of cotton may be operated upon at one time, I provide means for connecting two of the traps together. An arrangement of this kind is shown in Figure 6 of the drawings, and as seen in this view each trap employed is provided with a pair of eye-bolts 33, one for each end frame member 10. These eye-bolts may be originally provided on each of the traps, and one eye-bolt may serve to secure one end of the frame member 13 to an end frame member 10, while the other eye-bolt may serve to secure bar 31' and also the other end of the frame member 13 to the other end frame member 10. A sleeve 34 is provided into which the free ends of the bars 31' are extended, and suitable bolts 35 are extended through the sleeve and openings 32 of the bars 31' whereby to adjustably secure said bars together.

To each eye-bolt 33 of the two traps there is connected a cable or rope 36 and the cable or ropes 36 carried by each unit are connected at their free ends with a bar 37 which may be of wood. The bars 37 are each pivotally connected as at 38 to the one end of a yoke B, said yoke preferably consisting in a bar of wood formed intermediate its ends with an arcuate shaped portion 39 adapted to fit about the neck of a person.

In the operation of the device, shown in Figures 6 and 7, a man may step between the two traps and place the band or yoke B upon his shoulders so that the intermediate arcuate portion 35 will be disposed about the rear portion of his neck. He may now advance across the field and operate upon two rows of cotton as illustrated in Figure 6 and his hands may be employed for guiding the two traps and other purposes to maintain efficient operation of the traps.

It is to be here mentioned that the different frame members and other structural elements employed in the construction of the present trap, may be made from aluminum or other light metal and thus to produce a trap which is very light and may be carried a long period without tiring the operator. In substance the material would of course depend upon the dictates of the manufacturer, however, it is to be noted that the construction of the device permits the production of a light portable trap.

While I have shown and described the preferred form of my invention, I wish it to be understood that I am aware of the fact that the construction, combination and arrangement of parts may be changed by those skilled in the art without departing from the spirit of the invention as indicated by the appended claims:

1. An insect trap adapted to operate upon a row of plants, comprising a pair of insect receiving members, a distensible frame adapted to support said members and also serve for carrying the trap so that an insect receiving member will be disposed upon each side of a row of plants, and a fabric curtain disposed transversely of the frame and above said insect receiving member and having a passageway through which plants may pass, and the marginal edges of said curtain forming said passageway being adapted to brush the plants passing therethrough, and resilient and flexible fingers extending downwardly from the frame and adapted to yieldingly hold the curtain against movement.

2. An insect trap adapted to operate upon a row of plants, comprising a pair of insect receiving members, a distensible frame adapted to support said members and also serve for carrying the trap so that an insect receiving member will be disposed upon each side of a row of plants, a fabric curtain disposed transversely of the frame and above said insect receiving member and having a passageway through which plants may pass and the marginal edges of said curtain forming said passageway being adapted to brush the plants passing therethrough, and a plurality of resilient and flexible fingers extending downwardly from said frame and arranged in transverse spaced relation with respect to the frame and adapted to yieldingly resist the movement of said curtain.

3. An insect trap adapted to operate upon a row of plants, comprising a pair of insect receiving members, a distensible frame adapted to support said members and also serve for carrying the trap so that an insect receiving member will be disposed upon each side of a row of plants, a fabric curtain disposed transversely of the frame and above said insect receiving member and having a passageway through which plants may pass and the marginal edges of said curtain forming said passageway being adapted to brush the plants passing therethrough, a plurality of resilient and flexible fingers extending downwardly from said frame and arranged in transverse spaced relation with respect to the frame and adapted to yieldingly resist the movement of said curtain, and said fingers being removable whereby to permit the distance of the innermost fingers through which the plants must pass to be adjustable.

4. In a device of the character described, a supporting frame, a bail secured to each side of the frame, and a guide bar secured to the forward end of the frame and having a portion extending from each side thereof.

5. In a device of the character described, a carrier frame, a pair of receptacles supported by said frame adapted to straddle a row of plants, a curtain extending transversely of the frame, and having an elongated vertical slot through which the plants may pass, and vertically arranged flexible rods to which the curtain may be secured, and thereby to further agitate the plants with which said curtain may engage.

6. In a device of the character described, a carrier frame, a pair of receptacles supported by said frame, adapted to straddle a row of plants, a curtain extending transversely of the frame having a vertical elongated slot through which the plants may pass, flexible rods extending vertically and upon each side of the slot of the curtain, said rods being removable whereby to adjust the space existing between the two innermost rods with relation to said slot for the purpose described.

CORNELIUS CARSON CHRISTAL.